United States Patent [19]

Krieger

[11] Patent Number: 4,497,770
[45] Date of Patent: Feb. 5, 1985

[54] STORAGE STRUCTURE FOR NUCLEAR WASTE

[75] Inventor: Friedrich Krieger, Würzburg, Fed. Rep. of Germany

[73] Assignee: Salzgitter AG, Salzgitter, Fed. Rep. of Germany

[21] Appl. No.: 258,831

[22] Filed: Apr. 29, 1981

[51] Int. Cl.³ .............................................. G21C 19/40
[52] U.S. Cl. ..................................................... 376/272
[58] Field of Search ............................. 376/272, 463; 250/506.1, 507.1; 248/678, 544, 188.1

[56] References Cited

U.S. PATENT DOCUMENTS

| | | | |
|---|---|---|---|
| 2,477,648 | 8/1949 | Piggot et al. | 250/506.1 |
| 3,259,748 | 7/1966 | Lammers | 250/507.1 |
| 3,986,367 | 10/1976 | Kalpins | 250/506.1 X |
| 4,029,968 | 6/1977 | Rubinstein et al. | 376/272 |
| 4,088,897 | 5/1978 | Soot | 376/272 |
| 4,143,276 | 3/1979 | Mollon | 376/272 |

FOREIGN PATENT DOCUMENTS

| | | | |
|---|---|---|---|
| 2637879 | 3/1978 | Fed. Rep. of Germany | 376/272 |
| 2730850 | 1/1979 | Fed. Rep. of Germany | 376/272 |
| 2926300 | 1/1981 | Fed. Rep. of Germany | 376/272 |
| 2419794 | 11/1979 | France | |
| 946299 | 1/1964 | United Kingdom | 376/463 |

Primary Examiner—Richard E. Schafer
Assistant Examiner—Daniel Wasil
Attorney, Agent, or Firm—Horst M. Kasper

[57] ABSTRACT

A storage structure for storing radioactive materials. It includes tubular storage members provided near the bottom thereof with a plurality of horizontal bolts the longitudinal axes of which intersect at a common point of said axes. A plurality of support plates for said tubular member is provided at the lower end thereof. Each support plate is adapted to support one of said plurality of bolts and each support plate includes an upstanding portion. Said upstanding portion of each of said plurality of support plates is provided with an open recess including an upper relatively wide slanting entrance adapted for insertion of one of said plurality of bolts and a lower bolt-bearing surface coaxial with one of said plurality of bolts. One support plate may have several upstanding portions of which each has a recess for the insertion and the support of a bolt projecting from a different tube for storing radioactive materials.

8 Claims, 4 Drawing Figures

STORAGE STRUCTURE FOR NUCLEAR WASTE

BACKGROUND OF THE INVENTION

This invention relates to a storage structure for storing the used or spent heating elements of nuclear power plants, in particular heating elements that have been previously used and the radioactive emissions of which have been greatly reduced. The structure comprises a plurality of tubes which may be square or rectangular in cross-section and which may include one or a plurality of chambers for receiving the spent heating elements.

Speaking more specifically, this invention relates to an improvement of the storage structure according to the German "Offenlegungsschrift" No. 27 30 850. In order to absorb horizontal shocks, as may occur at earthquakes, or the like, the base plates of adjacent tubes are joined together to form a storage structure less susceptible to yield to accelerating forces. In such a storage structure the individual storage tubes must be secured to it after their insertion at any given time and detached from it at any given time after their insertion.

In cases where the storage tubes are permanently secured to a composite storage structure, the latter becomes so bulky that it can hardly be transported from one place to another. This calls for single smaller storage units, applicable to be connected to, and to form part of, a large composite storage structure after they have been lowered into it. This, however, also causes great difficulties, particularly if the screw connections between the individual storage tubes and the composite structure are insufficient, resulting in formation of kinks or bents in them at the occurrence of horizontal forces.

The primary object of this invention consists in providing improved storage means of the aforementioned character not subject to the aforementioned limitations and drawbacks.

A more specific object of this invention is to provide improved storage structures wherein the individual storage tubes are secured against the effects of horizontal forces, and the locking of the individual tubes to their support is effected exclusively by the weight of the tube when lowered, and the unlocking of the individual tubes is effected automatically when they are lifted out of the storage structure.

Other objects of this invention will become more apparent as this specification proceeds.

SUMMARY OF THE INVENTION

According to this invention each tubular storage member is provided near the bottom thereof with a plurality of horizontal bolts, the longitudinal axes of which intersect at a common point. A plurality of support plates for said tubular member is provided at the lower end thereof. Each of said plurality of support plates is adapted to support one of said plurality of bolts and each of said plurality of support plates includes an upstanding portion. Said upstanding portion of each of said plurality of support plates is provided with an open recess including an upper relatively wide slanting entrance for the insertion of one of said plurality of bolts, and a lower, substantially circular bolt-bearing surface coaxial with one of said plurality of bolts.

DESCRIPTION OF PREFERRED EMBODIMENT

Figure 1:
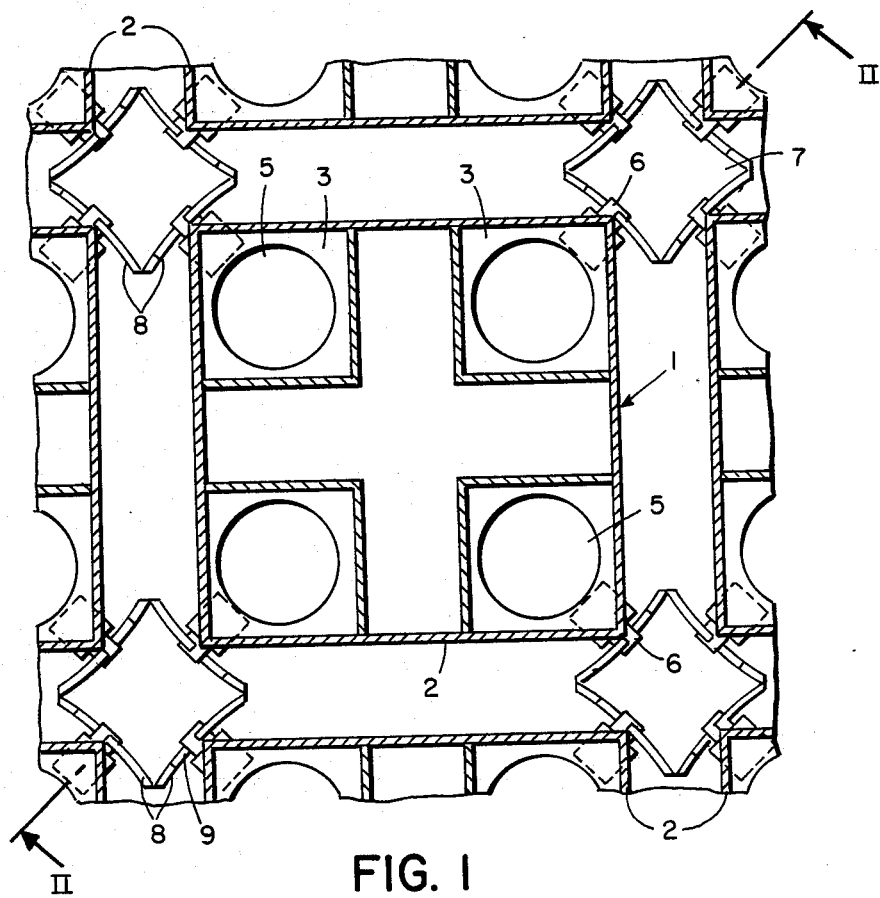
FIG. 1 is a diagrammatic horizontal section through a structure embodying the present invention in which the base plates are arranged outside of the storage tube members.

The support structure 1 is formed by a plurality of tubes 2 which may be square or rectangular in cross-section. Tubes 2 may be used to receive the nuclear waste. As an alternative, tubes 2 may be subdivided into several chambers 3 for receiving nuclear waste. The cross-section of these chambers depends upon the size of the radioactive material intended to be stored therein.

Each storage tube 2 is closed at its lower end by a plate 4. Plates 4 are perforated as indicated at 5 to admit a cooling medium, such as water, to the fuel elements in tubes 2, or chambers 3, respectively.

Figure 2:
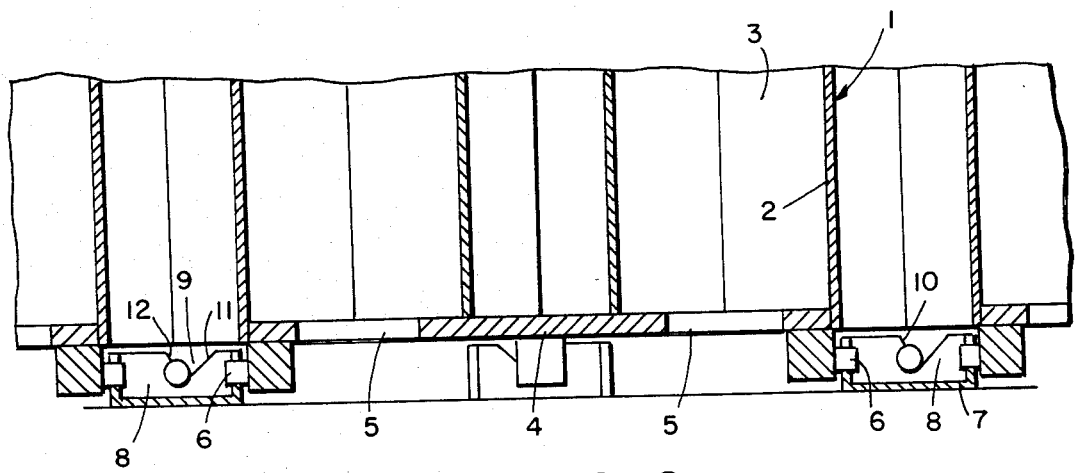
FIG. 2 is a section along II—II of FIG. 1.

A plurality of bolts 6 is affixed to each tube 2 below plate 4. The number of bolts 6 should be at least three, and is preferably four, as shown in FIGS. 1 and 2. The longitudinal axes of bolts 6 intersect at a common point. To obtain as large a resistance as possible against tripping or tilting forces which may occur when storage tubes 2 are subjected to horizontal forces, bolts 6 are arranged in diagonal directions of storage tubes 2 near the edges of the latter.

As shown in FIGS. 1 and 2, four support plates 7 are provided for supporting one storage tube 2, i.e. one plate 7 at each corner of one square or rectangular tube 2. Each of bolts 6 cooperates with one of support plates 7. Support plates 7 have upstanding portions 8. To be more specific, each supporting plate 7 has four upstanding portions 8 so that the entire structure 7,8 has the shape of a box having four side walls and being open at the top. Each upstanding portion 8—comparable to the side wall of a box open at the top thereof—is provided with a recess 9. Recesses 9 are open at the top and closed at the bottom thereof. The top ends, or open ends, of recesses 9 are slanting in opposite directions. Referring to FIG. 2, the open ends of recess 9 are both slanting, the left edge 10 bounding recess 9 slanting downwardly from left to right and the right edge 11 bounding recess 9 slanting downwardly from right to left. The surfaces 10,11 form guides for pins 6. Recess 9 has lower substantially circular bolt-bearing surfaces of which each is coaxially arranged to one of bolts 6. The diameter of these bolt-bearing surfaces is substantially equal to the diameter of bolts 6 to allow an easy engagement of bolt 6 with said bolt-bearing surfaces and at the same time allow a support of bolts 6 without play, or with a minimum of play.

When assembling the structure shown in FIGS. 1 and 2, a crane lowers each storage tube 2 into position. Each bolt 6 engages one of recesses 9 and is guided by slanting surfaces 10,11 toward the closed ends of recesses 9 which are adapted to ultimately receive and support bolts 6. The upstanding portions 8 of base plates 7 have a nose-like projection 12 that projects at least to the vertical median plane of the bolt 6 which is lowered into the particular recess 9. These nose-like projections lock bolts 6 in position against the action of upward directed forces.

The lateral or upstanding walls 8 are not necessarily planar as clearly shown in FIG. 1 of the drawings.

When a tube is lowered into the position shown in FIG. 1, its weight is initially supported by surfaces 10,11, and thereafter the bolts 6 engage the circular or cylindrical portion of recesses 9. During this process of insertion of storage tubes 2 into recesses 9 the former are caused to perform a slight rotary motion that ends when bolts 6 are fixedly supported by walls 8.

As shown in FIGS. 1 and 2, the four upstanding portions 8 of each base plate 7 each support one pin 6 forming part of, or affixed to, a different tube 2.

All vertical forces resulting from the weight of tubes 2 and that of their content, as well as all horizontal impact forces are transmitted by way of bolts 6 to base plates 7.

As shown in FIGS. 1 and 2, each storage tube 2 is held in position by four bolts each engaging one of four base plates 7, and each base plate 7 is adapted to lock in position four storage tubes 2.

Figure 3:
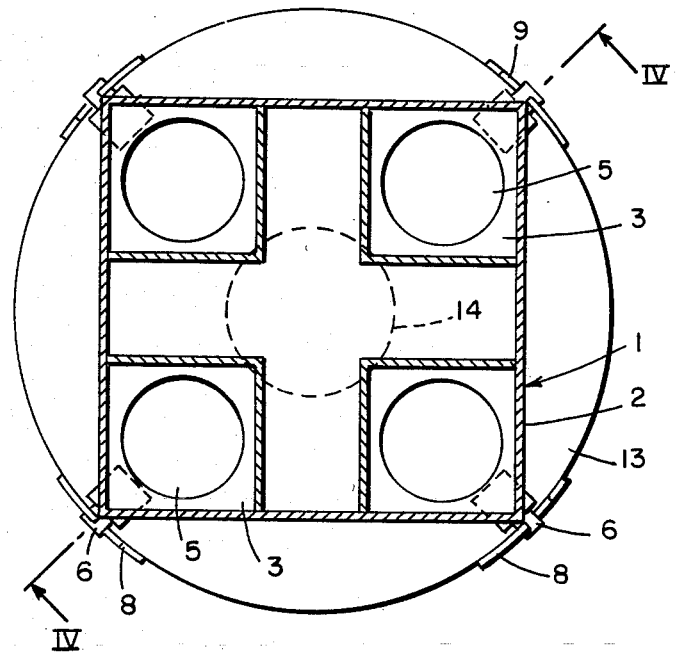
FIG. 3 is a diagrammatic horizontal section of a modification of a portion of the structure of FIG. 1 wherein the base plates are arranged outside the space defined by the cross-section of the tube members.
Figure 4:
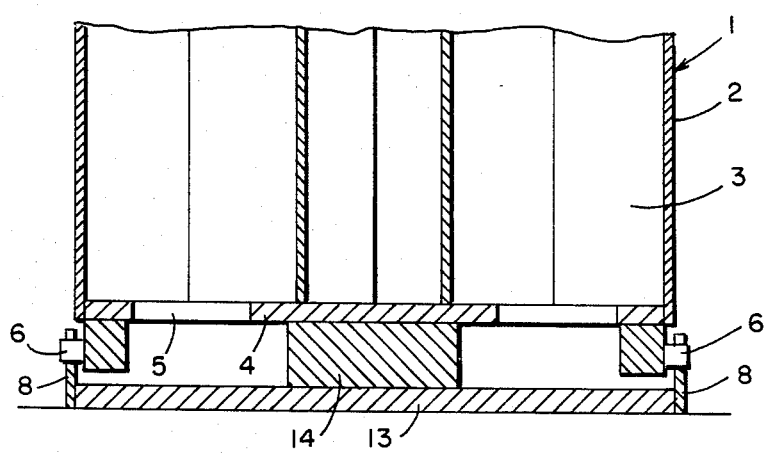
FIG. 4 is a cross-section along IV—IV of FIG. 3.

In FIGS. 3 and 4 the same reference numerals as in FIGS. 1 and 2 have been applied to indicate like parts. Thus FIGS. 3 and 4 require a description only to the extent that the structure shown therein differs from that shown in FIGS. 1 and 2.

FIGS. 3 and 4 show one single storage tube 2 for receiving nuclear material. It may be subdivided into a plurality of compartments 3. The tubular member 2 is provided near the bottom thereof with a plurality of horizontal bolts or, to be more specific, four horizontal bolts. Their longitudinal axes intersect at one point designated by the reference letter M. Tubular storage member 2 is supported by a first circular plate 13 having a plurality of upstanding portions 8 which are angularly displaced, e.g. 90 deg. Each upstanding portion 8 of plate 13 supports one of bolts 6. Each upstanding portion 8 is provided at the upper edge thereof with an open recess 9 for the insertion of bolts 6. The details of this recess 9 are the same as shown in FIGS. 1 and 2. They include a relatively wide slanting entrance defined by surfaces or planes 10, 11 for inserting one of said plurality of bolts 6. Recesses 9 further include a substantially circular relatively narrow bottom portion coaxial with one of said plurality of bolts 6. The first circular plate 13 and a second circular plate 4 are arranged parallel to each other. The latter is perforated to allow admission of a cooling medium to the chambers inside of storage tube 2. A spacer to which reference numeral 14 has been applied spaces plates 4 and 13.

The structure shown in FIGS. 1 to 4 is not limited to store fuel elements of a nuclear reactor. It may be used to store fuel elements which are still too highly radioactive and require an additional storage time before they can be shipped to a processing plant. The structure of FIGS. 1-4 may also be used for storing new radioactive fuel elements before they are used in a nuclear plant.

I claim:

1. A storage structure for storing waste of nuclear plants comprising a plurality of tubular waste storage members, each of said plurality of tubular members being adapted to form one or a plurality of waste storing chambers wherein
   (a) each of said plurality of tubular storage members is provided near the bottom thereof with at least three horizontal bolts for locking and supporting the storage members in a fixed position for storing waste of all nuclear plants the longitudinal axes of the bolts intersecting at a common point of said axes; wherein
   (b) a plurality of support plates for each of said plurality of tubular storage members is provided at the lower end of each of said plurality of storage members; wherein
   (c) each of said plurality of support plates has a plurality of upstanding portions equal in number to the number of bolts on one of said plurality of storage tubes; wherein
   (d) each of said plurality of upstanding portions of said plurality of support plates is provided with an open recess for insertion into one of said plurality of bolts; wherein
   (e) each recess is wide at the open end thereof and bounded by downward slanting surfaces of decreasing spacing; and wherein
   (f) each recess has a lower closed end which forms a substantially circular bolt-bearing surface coaxial with one of said plurality of bolts
   (g) wherein the longitudinal axis of each bolt intersects the center longitudinal axis of said tubular storage member, and wherein each bolt is disposed at a corner of said tubular storage member.

2. A storage structure as specified in claim 1 wherein
   (a) each of said plurality of tubular storage members is provided near the bottom thereof with four bolts; and wherein
   (b) each of said plurality of support plates has four sides of equal length and four upstanding portions of equal length of which each upstanding portion is provided with one open recess.

3. A storage structure as specified in claim 1 wherein the bottom of each of said plurality of tubular storage members is closed by a perforated plate for admission of cooling fluid to said chambers, and wherein said bolts are affixed with one end thereof to said perforated plate.

4. A storage structure as specified in claim 1 wherein
   (a) each recess is asymmetrical; wherein
   (b) each recess is formed by a relatively long portion and by a relatively short portion of one of said plurality of upstanding portions of one of said plurality of support plates; and wherein
   (c) said relatively short portion projects at least to the center of said substantially circular bolt-bearing surface to lock one of said plurality of bolts in position.

5. A storage structure as specified in claim 1 wherein each of said plurality of tubular storage members is rectangular in cross-section and wherein each of said plurality of horizontal bolts is arranged in the direction of the diagonals of one of said plurality of tubular storage members.

6. A storage structure as specified in claim 1 wherein the surface, which is bounding said open recess, has a nose-like projection that extends at least to the vertical median plane of one of said plurality of bolts to lock said one of said plurality of bolts in position against the action of upward directed forces.

7. A storage structure for waste of nuclear plants comprising a tubular member adapted to form one or more waste receiving chambers wherein
   (a) said tubular member is provided near the bottom thereof with at least three horizontal bolts the longitudinal axes of al the bolts intersecting at a point common to said longitudinal axes; wherein
   (b) said tubular member is supported by a first circular plate having a plurality of angularly displaced upstanding portions each for supporting one of said plurality of bolts; and wherein (c) each of said upstanding portions is provided on the upper edge thereof with an open recess, said recess including a relatively wide slanting entrance portion for inserting one of said at least three bolts therein, and said recess further including a substantially circular relatively narrow bottom portion coaxial with one of said plurality of horizontal bolts; and wherein (d) the longitudinal axis of each bolt intersects the center longitudinal axis of said tubular member, and wherein each bolt is disposed at a corner of said tubular member.

8. A storage structure as specified in claim 7 wherein
(a) said tubular member is closed at the bottom thereof by a second plate parallel to said first circular plate, said second plate being perforated for the admission of a cooling medium to said chambers; and wherein
(b) spacing means are interposed between said first plate and said second plate.

* * * * *